(12) United States Patent
Lee et al.

(10) Patent No.: US 10,594,847 B2
(45) Date of Patent: Mar. 17, 2020

(54) ELECTRONIC DEVICE HAVING CURVED WINDOW

(71) Applicant: SAMSUNG ELECTRONICS CO., LTD., Suwon-si, Gyeonggi-do (KR)

(72) Inventors: Yongseok Lee, Seoul (KR); Minsu Jung, Seoul (KR); Seungjae Bae, Yongin-si (KR); Jongkyun Im, Yongin-si (KR); Jina Mock, Suwon-si (KR); Jinyoung Park, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/482,401

(22) PCT Filed: Jan. 5, 2018

(86) PCT No.: PCT/KR2018/000303
§ 371 (c)(1),
(2) Date: Jul. 31, 2019

(87) PCT Pub. No.: WO2018/151412
PCT Pub. Date: Aug. 23, 2018

(65) Prior Publication Data
US 2020/0014781 A1    Jan. 9, 2020

(30) Foreign Application Priority Data

Feb. 15, 2017  (KR) .................... 10-2017-0020516

(51) Int. Cl.
*H04M 1/02* (2006.01)

(52) U.S. Cl.
CPC ....... *H04M 1/0266* (2013.01); *H04M 1/0264* (2013.01)

(58) Field of Classification Search
CPC . H04M 1/0266; H04M 1/0264; G06F 3/0488; G06F 1/1637; G06F 1/16
See application file for complete search history.

(56) References Cited

U.S. PATENT DOCUMENTS 9,061,542 B1 * 6/2015 Huang .................... B44F 1/063
9,298,220 B2 * 3/2016 Choi ..................... G06F 1/1626
(Continued)

FOREIGN PATENT DOCUMENTS

JP        2013-115231        6/2013
KR    10-2015-0144092       12/2015
(Continued)

OTHER PUBLICATIONS

International Search Report for PCT/KR2018/000303 dated Apr. 13, 2018, 6 pages.
(Continued)

*Primary Examiner* — Nizar N Sivji
(74) *Attorney, Agent, or Firm* — Nixon & Vanderhye, P.C.

(57) ABSTRACT

Disclosed is an electronic device comprising: a housing including a first plate, a second plate and a lateral member for covering a gap between the first plate and the second plate; a touch screen display exposed through a first part of the first plate; a sensor exposed through the first plate; a wireless communication circuit arranged inside the housing; and a processor which is arranged inside the housing and is electrically connected to the touch screen display, the sensor and the wireless communication circuit. In addition, other embodiments are possible.

18 Claims, 20 Drawing Sheets

(56) References Cited

U.S. PATENT DOCUMENTS

| | | | |
|---|---|---|---|
| 9,448,592 B2* | 9/2016 | Jin | H01L 51/5253 |
| 9,448,660 B2* | 9/2016 | Seo | G06F 3/0487 |
| 9,647,043 B2* | 5/2017 | Hirakata | G06F 3/1446 |
| 10,152,153 B2* | 12/2018 | Jung | G06F 3/0412 |
| 2014/0111927 A1 | 4/2014 | Raff | |
| 2016/0233037 A1 | 8/2016 | Lee et al. | |
| 2016/0266613 A1 | 9/2016 | Myers et al. | |
| 2016/0268523 A1 | 9/2016 | Kim et al. | |
| 2017/0078461 A1 | 3/2017 | Kim et al. | |

FOREIGN PATENT DOCUMENTS

| | | |
|---|---|---|
| KR | 10-1622892 | 5/2016 |
| KR | 10-2016-0097106 | 8/2016 |
| WO | 2014/062352 | 4/2014 |

OTHER PUBLICATIONS

Written Opinion of the ISA for PCT/KR2018/000303 dated Apr. 13, 2018, 5 pages.

* cited by examiner

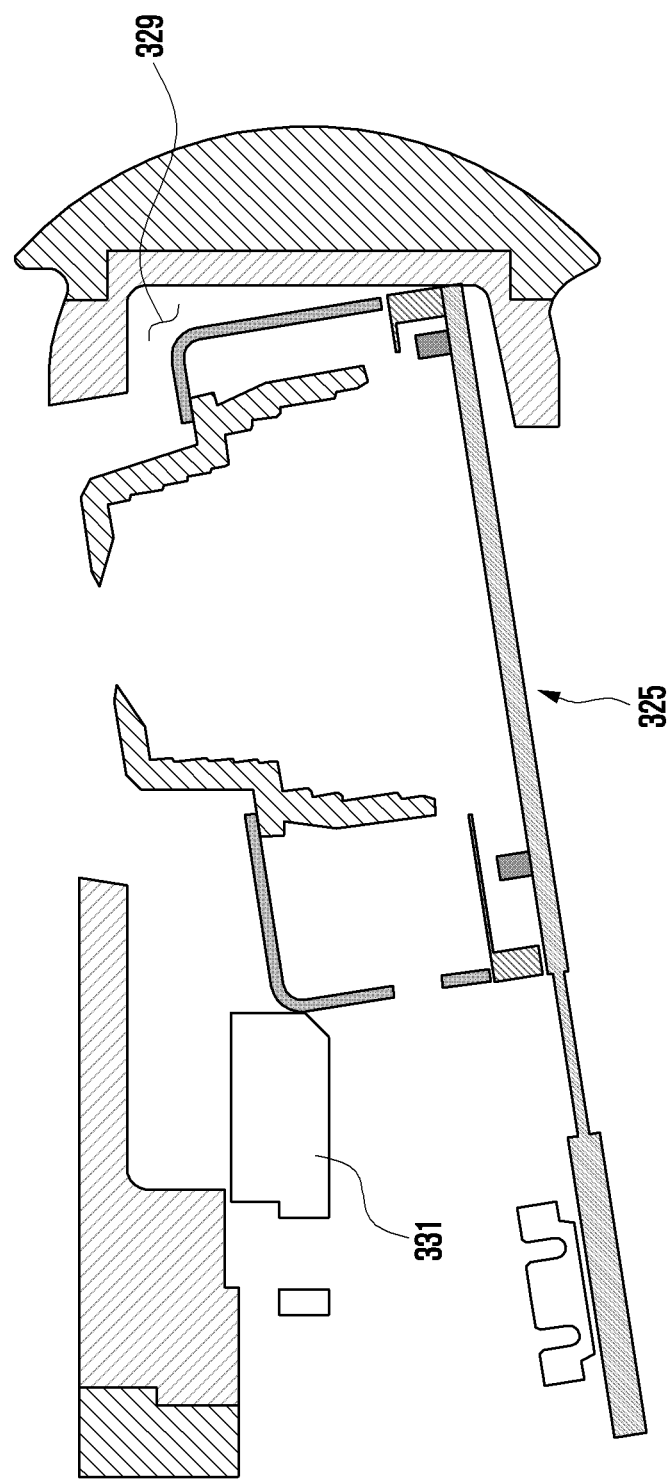

ELECTRONIC DEVICE HAVING CURVED WINDOW

This application is the U.S. national phase of International Application No. PCT/KR2018/000303 filed Jan. 5, 2018 which designated the U.S. and claims priority to KR Patent Application No. 10-2017-0020516 filed Feb. 15, 2017, the entire contents of each of which are hereby incorporated by reference.

TECHNICAL FIELD

The present invention relates to a housing of an electronic device having a curved surface at a front surface.

BACKGROUND ART

A front surface portion of an electronic device may be largely divided into a portion that displays information by a display and a black mask (BM) region in which a sensor and a camera module are positioned. Various efforts for reducing the black mask region are being attempted.

DESCRIPTION OF THE INVENTION

Technical Problem

In the case of an electronic device having a front window of a curved surface, a housing in which the window is seated may be also formed in a curved surface. In an electronic device having a housing of a metal material, a ball end mill tool may be used for processing a curved surface. Because of a shape limitation of the ball end mill tool, there is a limitation in that the housing follows a curved surface shape of the window; thus, an error may occur. Such a shape error may occur a tolerance in a coupling portion of the window and the housing.

The present invention provides an electronic device that can reduce a shape error between a housing and a window curved surface.

Solution to Problem

In accordance with an aspect of the present invention, an electronic device includes a housing including a first plate including a front surface and a rear surface, a second plate, and a side member enclosing a gap between the first plate and the second plate, wherein the first plate includes a flat portion, a corner, and a curved edge portion connecting between the flat portion and the corner, wherein the side member includes a metal portion disposed adjacent to the corner of the first plate and having an exposed surface formed at the outside; and a polymer portion forming an internal structure supporting the rear surface of the first plate and whose at least a partial region is overlapped with the curved edge portion when viewed from the front surface of the first plate, and wherein the metal portion includes a recess portion extended along the corner of the first plate and the recess portion has a curvature of less than 0.5 R based on an end surface perpendicular to the corner; a double-sided tape positioned between the rear surface of the first plate and the polymer portion to contact the rear surface of the first plate and the polymer portion; a touch screen display exposed through a first portion of the first plate; a sensor exposed through a second portion positioned between the corner and the first portion of the first plate when viewed from the front surface of the first plate; a wireless communication circuit disposed inside the housing; and a processor disposed inside the housing and electrically connected to the touch screen display, the sensor, and the wireless communication circuit.

In accordance with another aspect of the present invention, an electronic device includes a housing including a first plate including a front surface and a rear surface, a second plate, and a side member enclosing a gap between the first plate and the second plate, wherein the first plate includes a flat portion, a corner, and a curved edge portion connecting between the flat portion and the corner, and wherein the side member includes a metal portion disposed adjacent to the corner of the first plate and having an exposed surface formed at the outside; a polymer portion forming an internal structure supporting the rear surface of the first plate and whose at least a partial region is overlapped with the curved edge portion when viewed from the front surface of the first plate, wherein the polymer portion includes a recess portion extended along a corner position of the first plate, and wherein the recess portion has a curvature of less than 0.5 R based on an end surface perpendicular to the corner and a double-sided tape positioned between the rear surface of the first plate and the polymer portion to contact the rear surface of the first plate and the polymer portion; a touch screen display exposed through a first portion of the first plate; a sensor exposed through a second portion positioned between the corner and the first portion of the first plate when viewed from the front surface of the first plate; a wireless communication circuit disposed inside the housing; and a processor disposed inside the housing and electrically connected to the touch screen display, the sensor, and the wireless communication circuit.

In accordance with another aspect of the present invention, an electronic device includes a housing produced through an operation of primarily processing a metal portion, an operation of processing a polymer portion and a recess portion through an insert injection process using the metal portion as an insert, and an operation of processing the metal portion through primary ball end mill cutting processing.

In accordance with another aspect of the present invention, an electronic device includes a housing produced through an operation of primarily processing a metal portion, an operation of processing a polymer portion through an insert injection process using the metal portion as an insert, an operation of processing the metal portion and a recess portion through primary ball end mill cutting processing, and an operation of additionally processing at least some recess portions of the recess portion through a second ball end mill tool.

Advantageous Effects of Invention

As described above, according to an electronic device having a curved surface window of the present invention, by reducing a shape error of a housing and a window curved surface, a contact surface of the housing and a window can be increased.

BRIEF DESCRIPTION OF DRAWINGS

FIGS. 3B, 3C and 3D are diagrams illustrating a method of assembling a camera module according to another embodiment of the present invention.

MODE FOR THE INVENTION

Figure 1A:
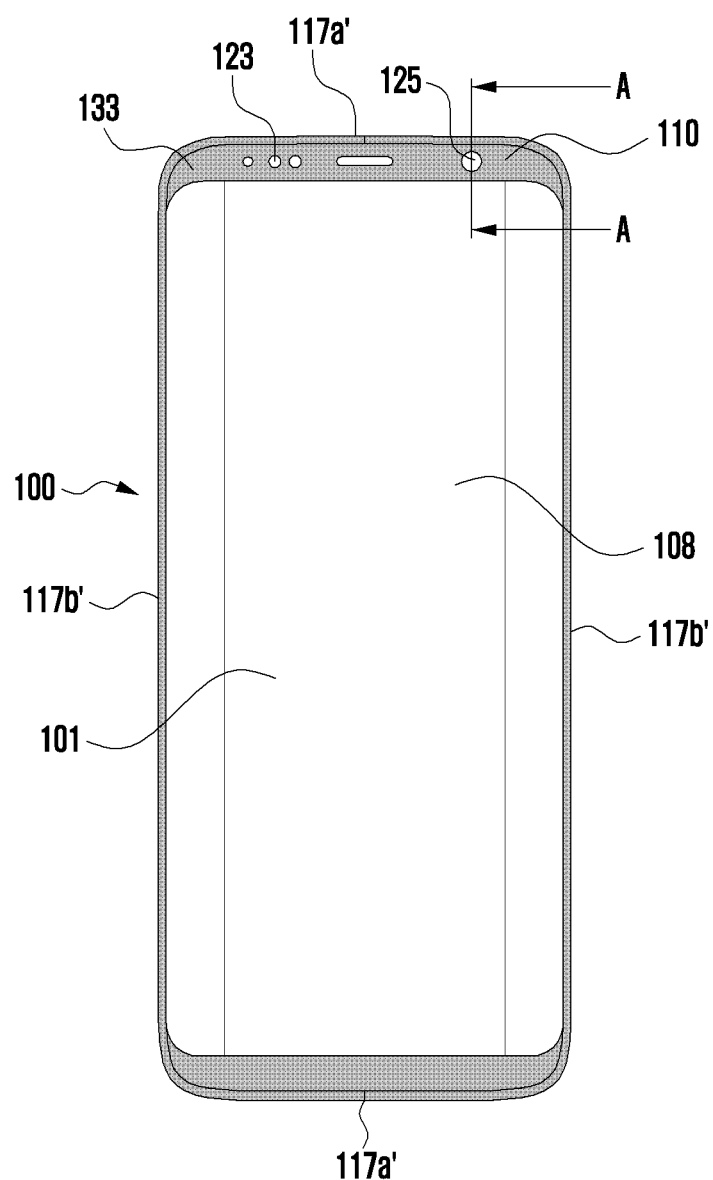
FIG. 1A is a diagram illustrating a first plate of an electronic device according to an embodiment of the present invention.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements. The terms "A or B," "at least one of A or/and B," or "one or more of A or/and B" as used herein include all possible combinations of items enumerated with them. The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Example electronic devices may include smart phones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, and/or wearable devices, but are not limited thereto. For example, the wearable devices may include accessory-type wearable devices, such as watches, rings, bracelets, anklets, necklaces, glasses, contact lenses, or head-mounted-devices (HMDs), fabric or clothing integral wearable devices, such as electronic clothes, body-mounted wearable devices, such as skin pads or tattoos, and/or implantable wearable devices, such as implantable circuits, but are not limited thereto. The electronic devices may include smart home appliances, such as televisions (TVs), digital versatile disk (DVD) players, audio players, refrigerators, air conditioners, cleaners, ovens, microwave ovens, washing machines, air cleaners, set-top boxes, home automation control panels, security control panels, TV boxes, such as Samsung HomeSync™, Apple TV™, or Google TV™), game consoles, such as Xbox™ and PlayStation™), electronic dictionaries, electronic keys, camcorders, and/or electronic picture frames, but are not limited thereto.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., alight bulb, various sensors, electric or gas meter, a sprinkler device, a fire alarm, a thermostat, astreetlamp, a toaster, a sporting goods, a hot water tank, a heater, a boiler, etc.). The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology. Hereinafter, an electronic device according to various embodiments will be described with reference to the accompanying drawings. In the disclosure, the term "user" may indicate a person using an electronic device or a device (e.g., an artificial intelligence electronic device) using an electronic device.

Figure 1B:
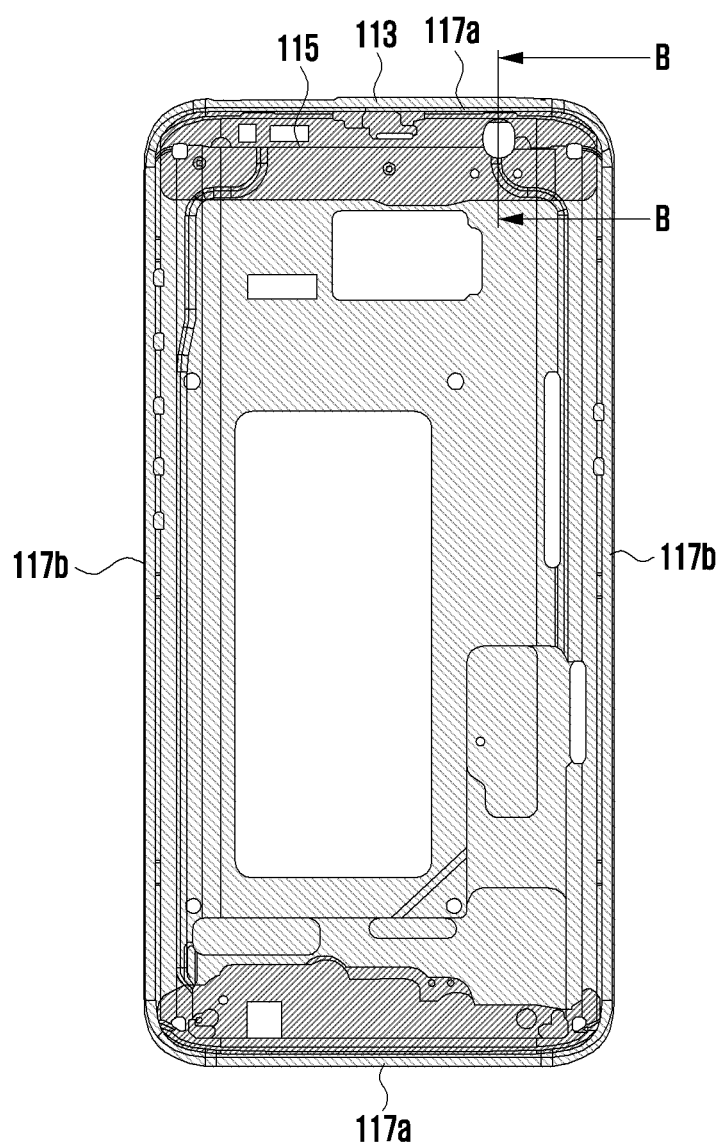
FIG. 1B is a diagram illustrating a housing of an electronic device according to an embodiment of the present invention.

FIG. 1A is a diagram illustrating a first plate 101 of an electronic device according to an embodiment of the present invention, and FIG. 1B is a diagram illustrating side members 113 and 115 of an electronic device according to an embodiment of the present invention.

Figure 3A:
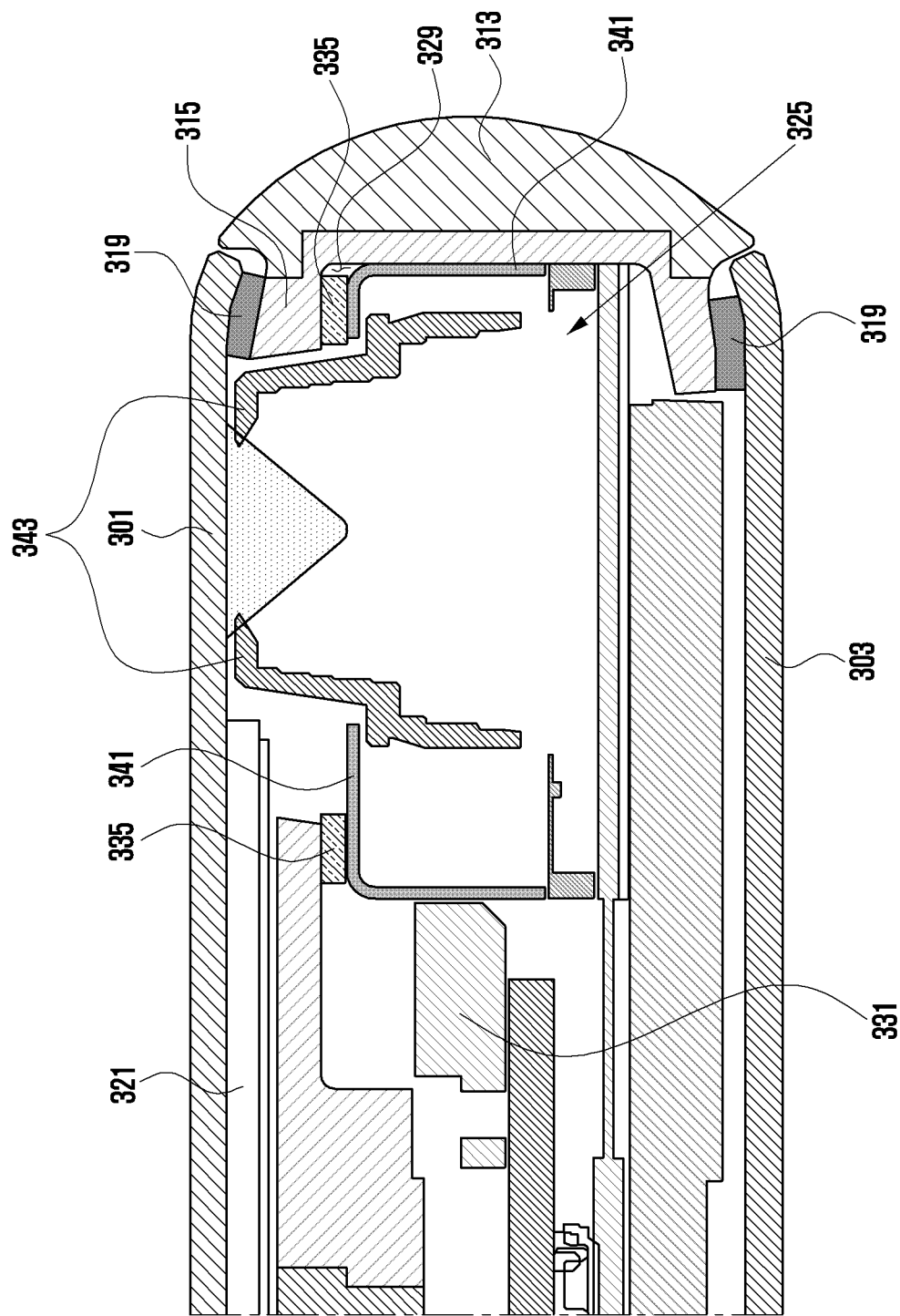
FIG. 3A is a cross-sectional view illustrating the housing taken along line B-B of FIG. 1B according to another embodiment of the present invention.

The electronic device according to an embodiment of the present invention may include a housing 100, display 321 (see FIG. 3A), sensor, or camera module 325 (see FIG. 3A). The housing 100 may include a first plate 101, second plate 103, and side members 113 and 115.

The first plate 101 may be window glass exposed to a front surface of the electronic device and may be configured with a front surface that directly contacts a user when the electronic device is used and a rear surface, which is a surface opposite to the front surface. The second plate 103 may be positioned at a surface opposite to the first plate 101 based on the side members 113 and 115 and may be made of various materials such as glass, metal, and plastic polymer.

Figure 1C:
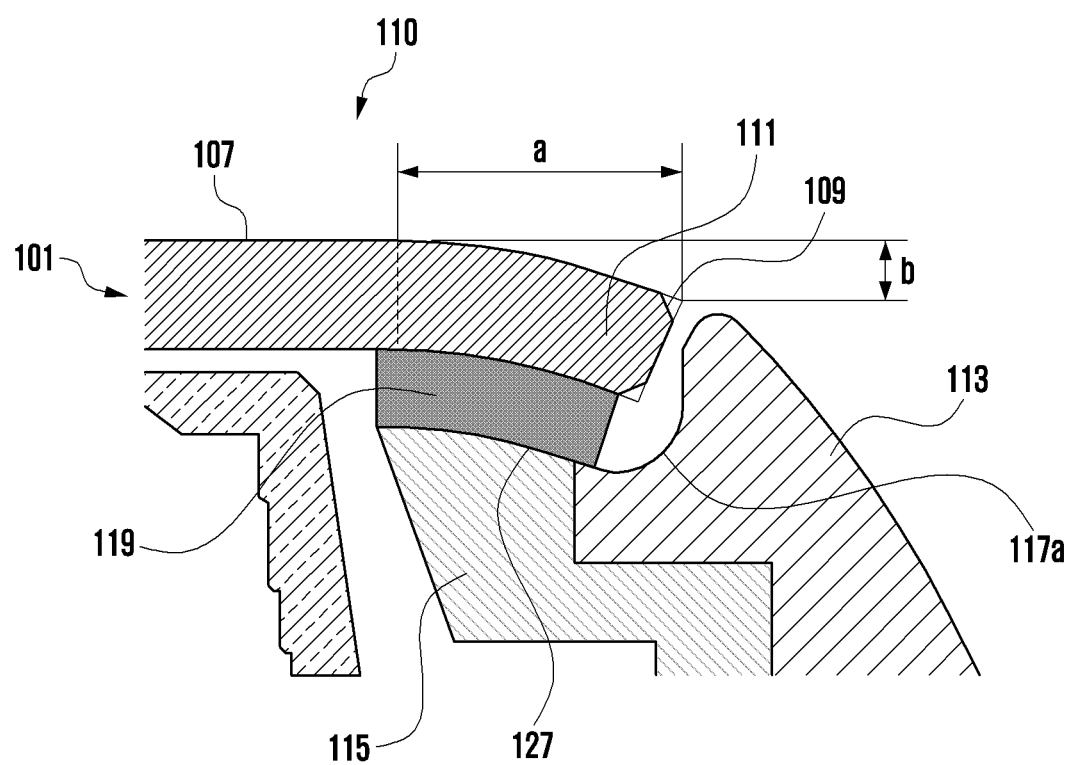
FIG. 1C is a cross-sectional view illustrating the housing taken along line A-A of FIG. 1B.

With reference to FIG. 1C, the first plate 101 may include a flat portion 107 and an curved edge portion 111 extended from the flat portion 107 to be connected to a corner 109 of the first plate 101 and forming a curved surface. A touch screen display (see 321 of FIG. 3A) may be exposed through a first portion 108 of the first plate 101. The sensor or the camera module (see 325 of FIG. 3A) may be exposed through a second portion 110 of the first plate 101.

The first portion 108 may mean a partial region of the flat portion 107. The second portion 110 may mean a portion between the first portion 108 and the corner 109 of the first plate 101. The second portion 110 may include a flat portion 107 and a curved edge portion 111.

A sensor hole 123 or a camera hole 125 that exposes the sensor or the camera module 325 (see FIG. 3A) may be formed in a region of a black mask 133. The black mask 133 region may correspond to the second portion 110.

The black mask 133 region may be divided into an attachment region of a double-sided tape 119 that couples the first plate 101 to the side members 113 and 115 and that prevents entrance of moisture or foreign matter from the outside and an region occupied by the sensor hole 123 or the camera hole 125 for exposing components such as the sensor or the camera module 325 (see FIG. 3A).

The electronic device according to various embodiments of the present invention reduces an area that the camera module 325 (see FIG. 3A) occupies in the black mask 133 region through undercut 329 (see FIG. 3A) to be described later and secures an attachment space of the double-sided tape 119 using a recess portion 117 to be described later, thereby reducing the black mask 133 region using a region that conventionally has not been used. Specific methods will be described later in detail with reference to the drawings.

With reference to FIG. 1A, in the first plate 101, an outermost corner 109 (see FIG. 1C) may be divided into upper and lower ends 117a' and right and left ends 117b'. The above-mentioned upper and lower and right and left directions are set arbitrarily to help an understanding of various embodiments according to the present invention and are not absolute references.

The camera module 325 (see FIG. 3A) may be disposed in the black mask 133 region, and a portion of the camera module 325 (see FIG. 3A) of the black mask 133 region through the undercut 329 (see FIG. 3A) to be described later may be moved to a metal portion 113 of the side member. Thereby, the black mask 133 region may be reduced, and a larger touch screen display 321 (see FIG. 3A) region may be secured within the first plate 101 of the same size.

With reference to FIG. 1B, the side members 113 and 115 include a metal portion 113 and a polymer portion 115, and at least one side of the metal portion 113 and the polymer portion 115 may include a recess portion 117.

The side members 113 and 115 may provide a space in which various components, constituting the electronic device, such as the first plate 101, the second plate 103, the touch screen display 321 (see FIG. 3A), a printed circuit board (PCB), and a battery may be seated, form an internal structure of the electronic device, and perform a function of a frame that maintains a shape of the electronic device.

The metal portion 113 may be disposed adjacent to the corner 109 of the first plate 101 to form an exposed surface in the outside. The polymer portion 115 may support a rear surface of the first plate 101 and may form an internal structure. The recess portion 117 may be formed in at least one side of the metal portion 113 and the polymer portion 115 to correspond to a location in which the corner 109 of the first plate is positioned. The recess portion 117 may be divided into recess portions 117a of the upper and lower ends and recess portions 117b of the right and left ends to correspond to the upper and lower ends 117a' and the right and left ends 117b' of the first plate 101.

FIG. 1C is a cross-sectional view illustrating the housing taken along line A-A of FIG. 1A according to an embodiment of the present invention.

An inflection rate of the curved edge portion 111 of the first plate 101 may be defined with various methods. For example, the inflection rate may be defined to a curvature of a circle or an ellipse, and an inflection range of the curved edge portion 111 may be defined to a width length a and a vertical length b, as illustrated in FIG. 10, and may be represented with a ratio of a width/length of an inflection range as in a/b.

According to an exemplary embodiment of the present invention, the inflection ratio a/b of the curved edge portion 111 may be set in a range of 2 to 8; and, preferably, the width length a may be set to 1.3 mm, the vertical length b may be set to 0.3 m, and the inflection ratio may be set to 4.33. However, an inflection ratio of the curved edge portion 111 is not limited to the above value.

The first plate 101 may be coupled to the side members 113 and 115 through the double-sided tape 119. The double-sided tape 119 according to an embodiment of the present invention is not limited to a known double-sided tape and may include a material 119 that provides a coupling force between objects.

By filling a gap that may occur between the first plate 101 and the side members 113 and 115, the double-sided tape 119 may serve to prevent a foreign matter or moisture from entering into the electronic device.

In order to prevent entrance of moisture or foreign matter and to provide a sufficient coupling force between the first plate 101 and the side members 113 and 115, a region of a predetermined area or more for attaching the double-sided tape 119 may be required.

As the curved edge portion 111 is formed in the first plate 101, in at least a partial region of the metal portion 113 and the polymer portion 115 of the side members 113 and 115, a curved surface 127 corresponding to a curvature of the curved edge portion of the first plate 101 may be formed.

The curved surface 127 of the polymer portion 115 and the metal portion 113 may be formed through various processing methods such as injection molding or cutting processing, and the curved surface 127 according to an embodiment of the present invention may be formed through a cutting processing using a ball end mill. In a processing process of the curved surface 127 using the ball end mill, the recess portion 117 using a radius of a ball portion of the end of the ball end mill tool as a curvature along a position of the corner 109 of the first plate 101 may be formed in the metal portion 113 or the polymer portion 115 by a shape characteristic of the ball end mill tool.

An error may occur in a shape of the curved edge portion 111 and the curved surface 127 by the recess portion 117. More specifically, the corner 109 of the first plate 101 is sharply formed, but the recess portion 117 formed along a location of the corner 109 may be roundly formed using a radius of an end ball portion of the ball end mill tool as a curvature by the above-described shape characteristic of the ball end mill tool. Therefore, because the recess portion 117 does not implement accurately a shape of the sharply formed corner 109 of the first plate, a shape following property to the corner 109 of the first plate 101 is lowered and a phenomenon may occur in which the corner 109 of the first plate interferes with the recess portion 117.

In a portion in which the corner 109 of the first plate 101 interferes with the recess portion 117, it may be difficult to attach the double-sided tape 119, and by improving a shape following property to the first plate corner 109 of the recess portion 117 by minimizing a curvature formed in the recess portion 117, an attachment area of the double-sided tape 119 may be secured.

A specific method of securing an area for attaching the double-sided tape 119 according to various embodiments of the present invention will be described with reference to the drawings.

Figure 2A:
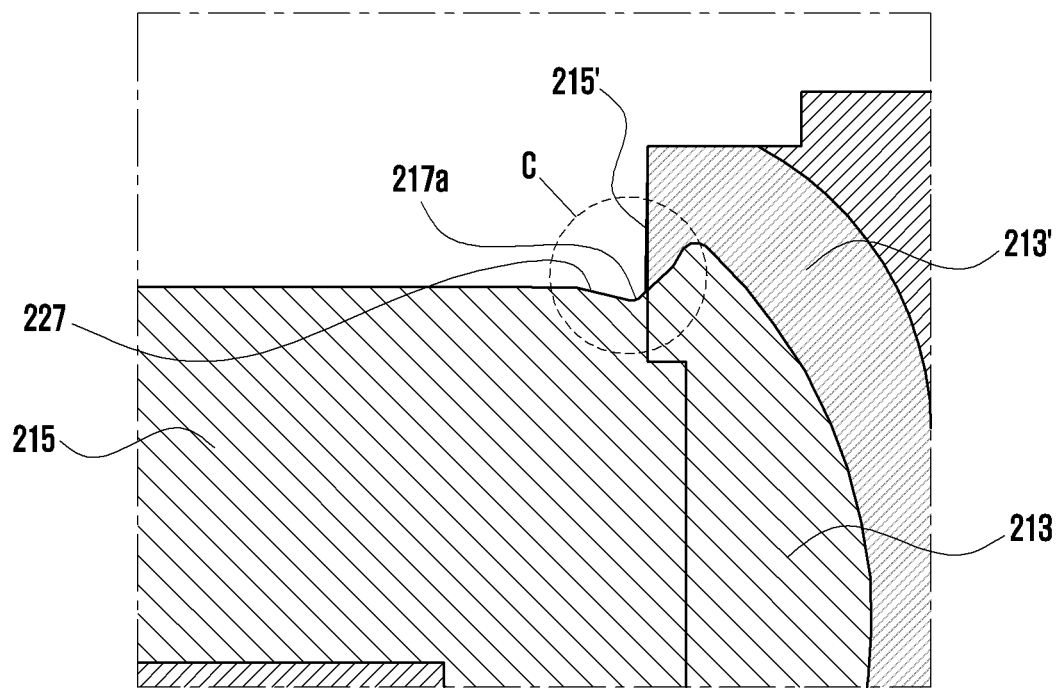
FIG. 2A is a cross-sectional view illustrating the housing taken along line B-B of FIG. 1B according to another embodiment of the present invention.
Figure 2B:
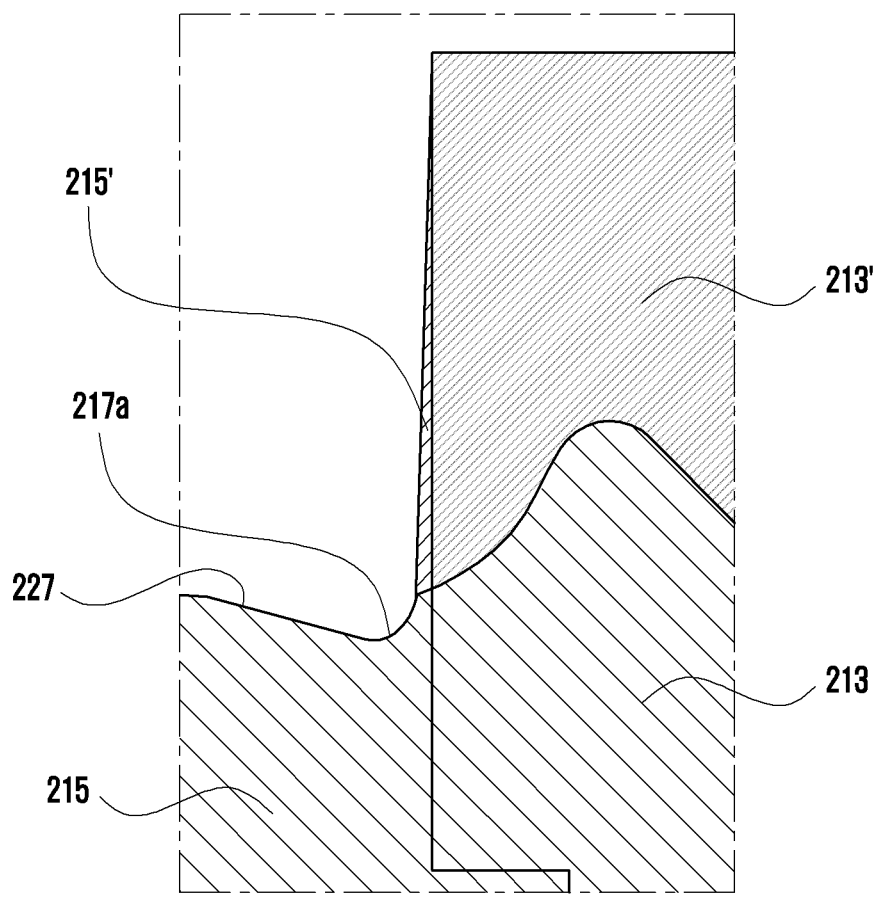
FIG. 2B is an enlarged view illustrating a portion C of FIG. 2A.

FIG. 2A is a cross-sectional view illustrating the housing taken along line B-B of FIG. 1B according to another embodiment of the present invention, and FIG. 2B is an enlarged view illustrating a portion C of FIG. 2A.

A recess portion 217 according to an embodiment of the present invention may be formed in the polymer portion 215. In order to solidify a coupling force to a metal portion 213, the polymer portion 215 may be molded through insert injection using the metal portion 213 as an insert.

In at least a partial region of the polymer portion 215 and the metal portion 213, a curved surface 227 corresponding to a curvature of the curved edge portion 111 (see FIG. 1C) of the first plate may be formed, and the curved surface 227 may be formed in an insert injection operation.

Specifically, by processing a shape corresponding to the curved edge portion 111 (see FIG. 1C) of the first plate in a mold used in an insert injection operation, the curved surface 227 may not be processed through a cutting processing using a ball end mill tool. By improving a shape following property to the first plate corner 109 of the recess portion 217 by reducing a radius of the recess portion 217 through an insert injection molding operation, an attachment area of the double-sided tape 119 may be secured. Thereby, an interfered area between the first plate corner 109 and the recess portion 217 may be reduced, and the reduced area may be used as a bonding space of the double-sided tape 119.

With reference to FIG. 2B, an operation of cutting excess regions 215' and 213' of the polymer portion 215 and the metal portion 213 may be performed through a cutting processing using the ball end mill tool and the operation may not affect the forming of the recess portion 217.

FIG. 3A is a cross-sectional view illustrating the housing taken along line A-A of FIG. 1A according to another embodiment of the present invention.

As described above, the camera module 325 may have a large correlation with an area of a region of the black mask 133 (see FIG. 1).

In a polymer portion 315 according to an embodiment of the present invention, undercut 329 may be formed to enable one end portion of a main body 341 of the camera module 325 to be inserted into the undercut 329. Thereby, by reducing an area of the camera module 325 exposed in the first plate 301, a region of the black mask 133 (see FIG. 1A) may be reduced.

Figure 3C:
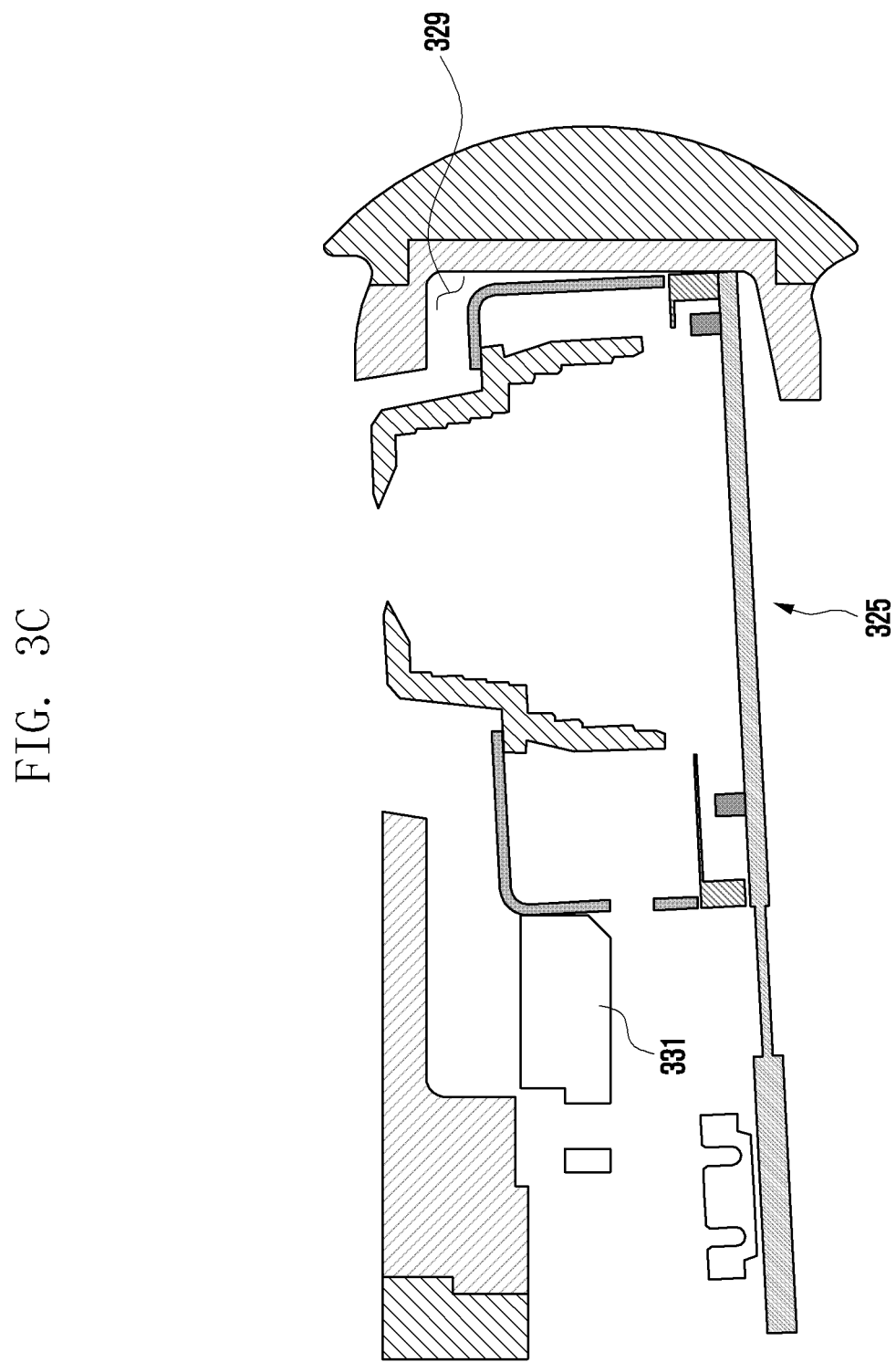
Figure 3D:
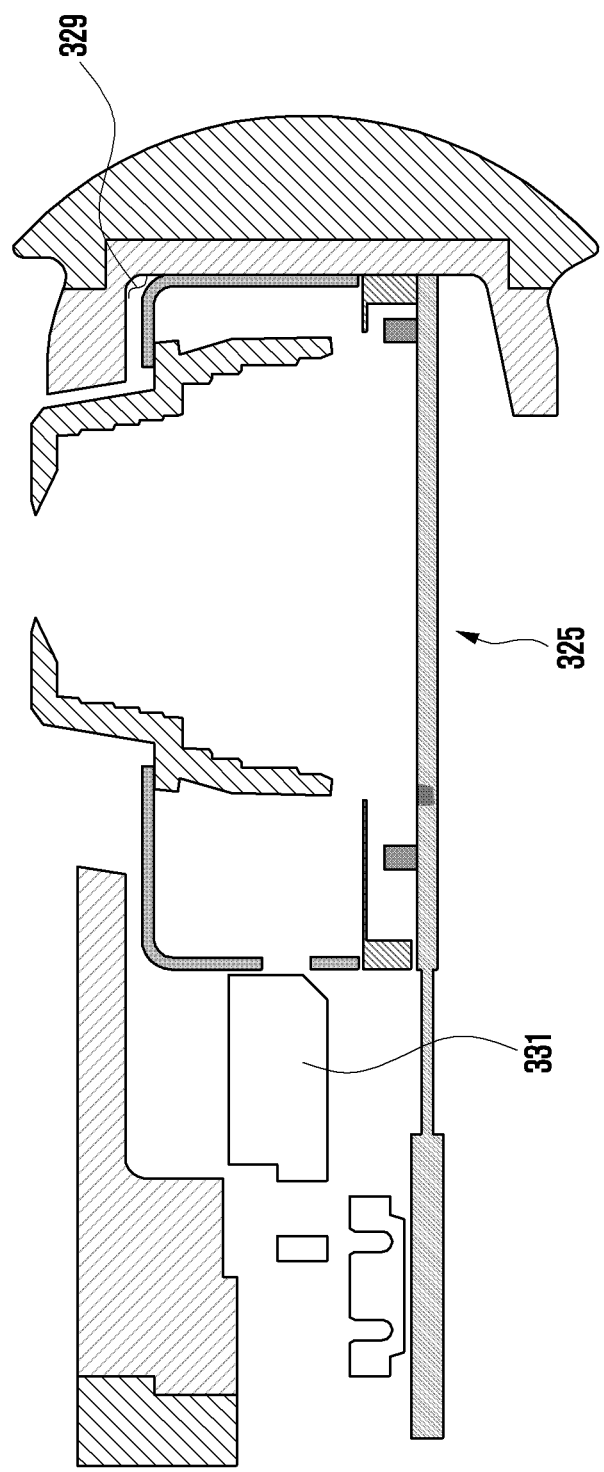

FIGS. 3B to 3D are diagrams illustrating a method of assembling the camera module 325 of FIG. 3A according to another embodiment of the present invention.

After inserting one end portion of the camera module 325 into the undercut 329, by rotating the other end portion about one end portion, the camera module 325 may be coupled to the electronic device. The electronic device according to an embodiment of the present invention may further include a fixing bracket for preventing the camera module 325 from being separated from the electronic device by being separated from the undercut 329.

Figure 4A:
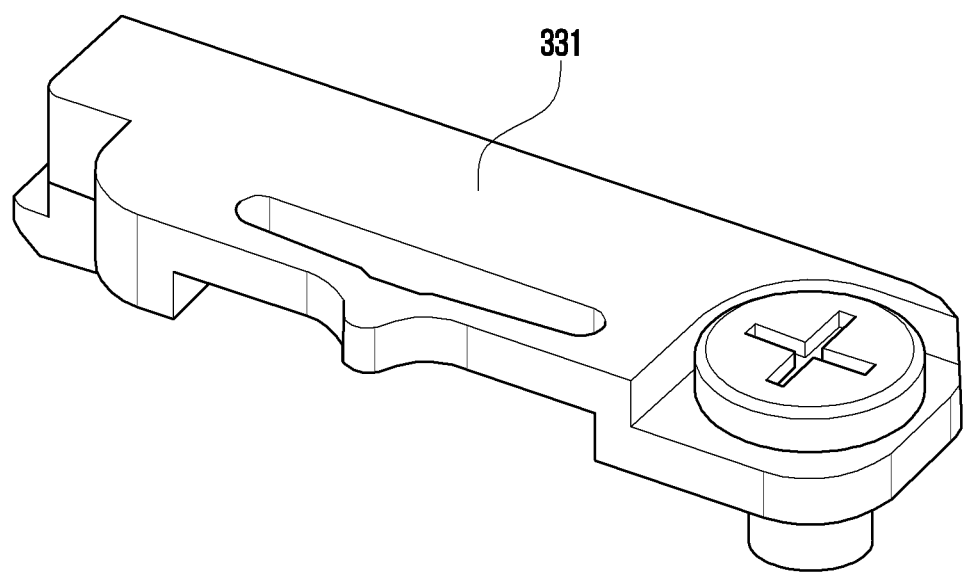
FIGS. 4A and 4B are diagrams illustrating a fixing bracket according to an embodiment of the present invention.
Figure 4B:
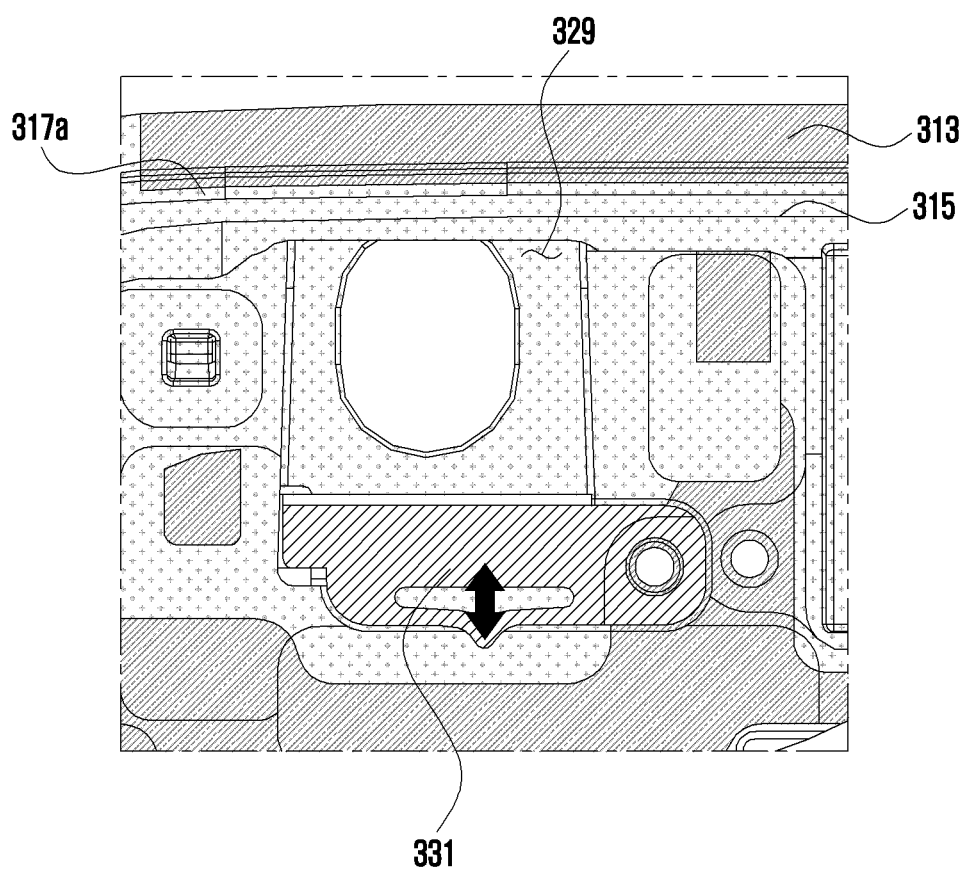

FIGS. 4A and 4B are diagrams illustrating a fixing bracket 331 according to an embodiment of the present invention.

The fixing bracket 331 presses the camera module 325 (see FIG. 3A) in an insertion direction into the undercut 329 to prevent the camera module 325 (see FIG. 3A) from being separated from the undercut 329. The fixing bracket 331 may be provided to perform a reciprocating motion in a direction of the undercut 329 and press the camera module 325 (see FIG. 3A) in a direction of the undercut 329 through an elastic body. The fixing bracket 331 may be provided to perform a reciprocating motion in a direction of the undercut 329 to absorb a gap between a length of a main body 341 of the camera module 325 (see FIG. 3A) and a rotation radius of the camera module 325 (see FIG. 3A).

The elastic member may be integrally formed with the fixing bracket 331. As illustrated in FIGS. 4A and 4B, when the protruded portion is pressed, the protruded portion may be elastically deformed, and the camera module 325 (see FIG. 3A) may be pressed in a direction of the undercut 329 through a restoring force occurring after being deformed.

The fixing bracket 331 may be fixed through bolt coupling to couple more securely to the camera module 325 (see FIG. 3A).

Figure 5A:
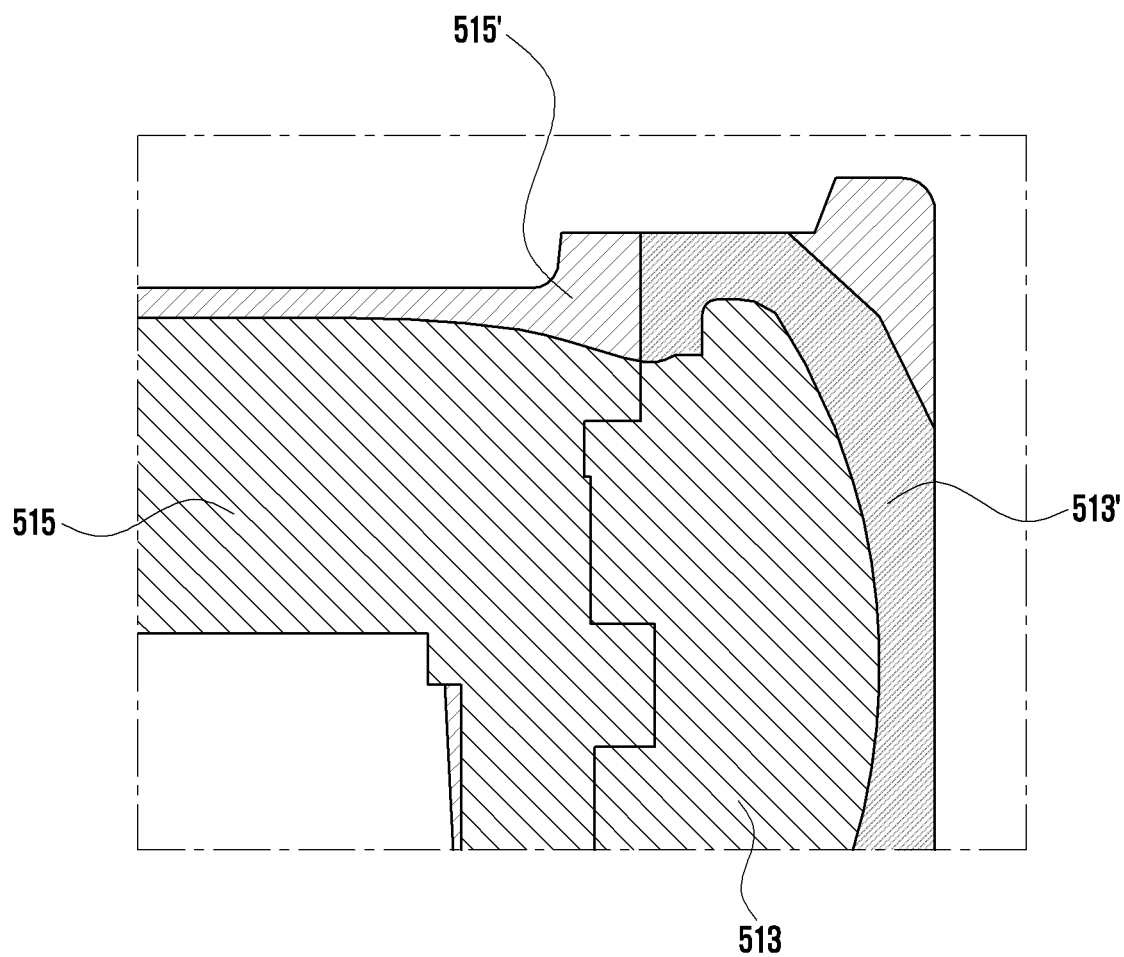
FIGS. 5A, 5B, and 5C are cross-sectional views illustrating a housing taken along line B-B of FIG. 1B according to another embodiment of the present invention.
Figure 5B:
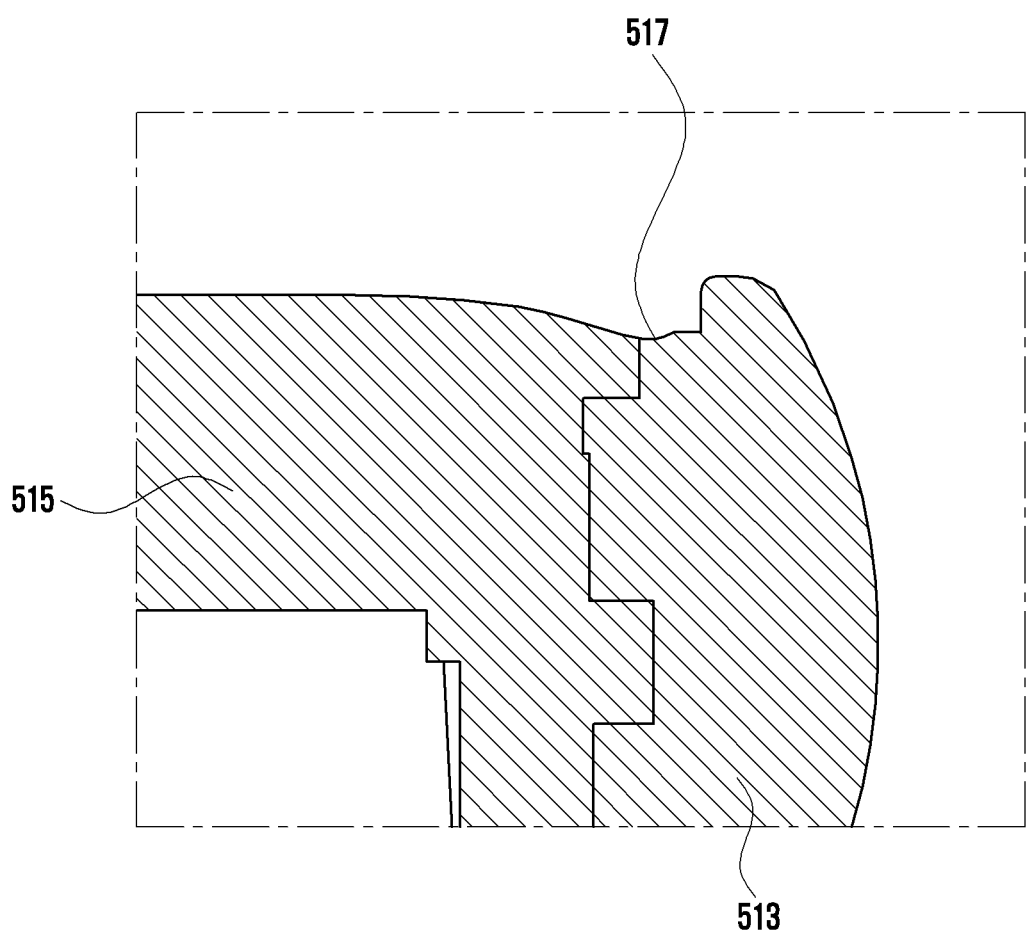
Figure 5C:
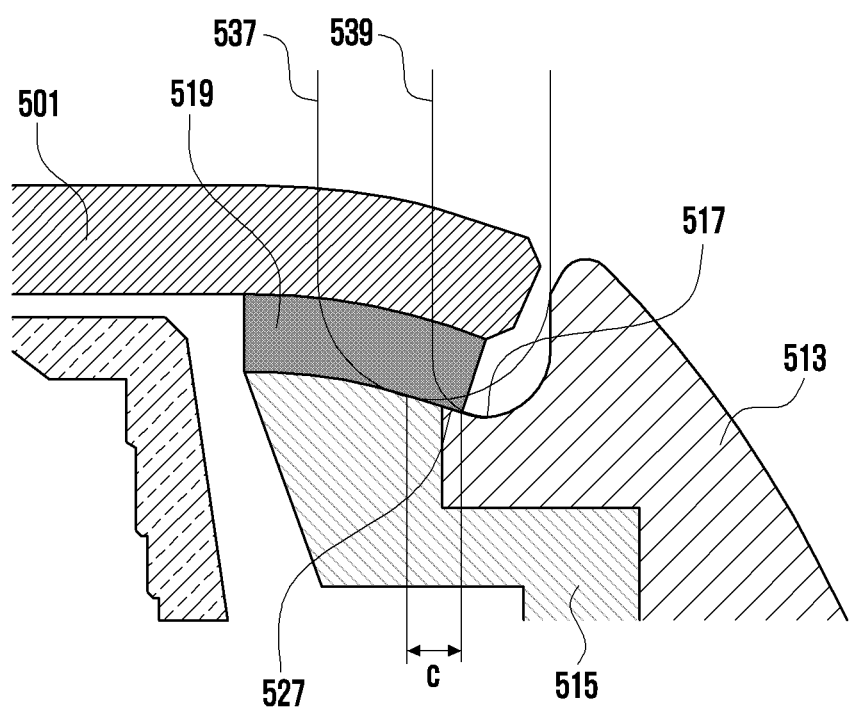

FIGS. 5A 5B and 5C are cross-sectional views illustrating a housing taken along line B-B of FIG. 1B according to another embodiment of the present invention.

A recess portion 517 according to an embodiment of the present invention may be formed in a metal portion 513.

In order to solidify a coupling force with the metal portion 513, a polymer portion 515 may be molded through insert injection using the metal portion 513 as the insert.

In at least a partial area of the polymer portion 515 and the metal portion 513, a curved surface 527 corresponding to a curvature of the curved edge portion 111 (see FIG. 1) of the first plate may be formed, and when the curved surface 527 is formed in the metal portion 513, the curved surface 527 may be processed through a cutting process through a ball end mill tool.

The above-described curvature of the recess portion 517 may be formed according to shape characteristics of the ball end mill tool, and a ball end mill 537 having a diameter of 1 mm may be used in consideration of workability and productivity. An excess portion 515' of the polymer portion 515 and an excess portion 513' of the metal portion 513 may be removed through a cutting operation using the ball end mill tool. When using a ball end mill tool of a smaller diameter, accuracy increases as much as a reduced curvature of the recess portion; thus, a shape of the curved edge portion 111 (see FIG. 1) and a shape following property of the curved surface 527 may be improved, but workability and productivity may be adversely affected.

Therefore, in an electronic device according to an embodiment of the present invention, as illustrated in FIG. 5C, by additionally processing the recess portion 117a (see FIG. 1B) corresponding to a corner 117a' (see FIG. 1A) of the upper end and lower end of the first plate using the ball end mill tool 537 having a diameter of 1 mm or less, a curvature of the recess portion 517 may be reduced. Thereby, by reducing an interfering portion of the recess portion 117a (see FIG. 1B) and the corner 117a' (see FIG. 1A) of the upper end and the lower end of the first plate, an adhesion area of the double-sided tape 119 (see FIG. 10) may be secured.

For example, when the ball end mill tool 537 having a diameter of 1 mm is primarily used and additional processing is performed with a ball end mill tool 539 having a diameter of 0.6 mm, an adhesion area of the double-sided tape 119 (see FIG. 10) may be further secured by about 0.2 mm (portion c).

An electronic device according to an embodiment of the present invention includes a housing including a first plate including a front surface and a rear surface, a second plate, and a side member enclosing a gap between the first plate and the second plate, wherein the first plate includes a flat portion, a corner, and a curved edge portion connecting between the flat portion and the corner, and wherein the side member includes a metal portion disposed adjacent to the corner of the first plate and having an exposed surface formed at the outside; a polymer portion forming an internal structure supporting the rear surface of the first plate and whose at least a partial region is overlapped with the curved edge portion when viewed from the front surface of the first plate, wherein the metal portion includes a recess portion extended along a corner position of the first plate and the recess portion has a curvature of less than 0.5 R based on an end surface perpendicular to the corner; a double-sided tape positioned between the rear surface of the first plate and the polymer portion to contact the rear surface of the first plate and the polymer portion; a touch screen display exposed through a first portion of the first plate; a sensor exposed through a second portion positioned between the corner and the first portion of the first plate when viewed from the front surface of the first plate; a wireless communication circuit disposed inside the housing; and a processor disposed inside the housing and electrically connected to the touch screen display, the sensor, and the wireless communication circuit.

The touch screen display and the sensor may be exposed through the flat portion of the first plate.

The double-sided tape may be positioned between the rear surface of the first plate and a partial region of the recess portion of the metal portion to contact the rear surface of the first plate and a partial region of the recess portion of the metal portion.

In at least a partial area of the polymer portion and the metal portion, a curved surface facing the rear surface of the first plate and corresponding to a curvature of the curved edge portion of the first plate may be formed.

The recess portion may have a curvature of 0.3 R or more.

When viewed from the front surface of the first plate, a curvature of the upper and lower ends of the recess portion may be smaller than that of the right and left ends thereof.

When a distance from a border line of the flat portion and the curved edge portion to the corner is a and when a vertical distance from the corner to the front surface of the first plate is b, a value of a/b may be in a range of 2 to 8.

The electronic device may further include a camera module exposed through the flat portion of the first plate, wherein an undercut may be formed toward an outer peripheral surface of the side member in the polymer portion at a location in which the camera module is positioned.

The electronic device may further include a fixing bracket configured to support an end portion of one side of the camera module to be not separated after being inserted into and coupled to the undercut.

An electronic device according to an embodiment of the present invention includes a housing including a first plate including a front surface and a rear surface, a second plate, and a side member enclosing a gap between the first plate and the second plate, wherein the first plate includes a flat portion, a corner, and a curved edge portion connecting between the flat portion and the corner, and wherein the side member includes a metal portion disposed adjacent to the corner of the first plate and having an exposed surface formed at the outside; a polymer portion forming an internal structure supporting the rear surface of the first plate and whose at least a partial region is overlapped with the curved edge portion when viewed from the front surface of the first plate, wherein the polymer portion includes a recess portion extended along a corner position of the first plate, and wherein the recess portion has a curvature of less than 0.5 R based on an end surface perpendicular to the corner, and a double-sided tape positioned between the rear surface of the first plate and the polymer portion to contact the rear surface of the first plate and the polymer portion; a touch screen display exposed through the first portion of the first plate; a sensor exposed through a second portion positioned between the corner of the first plate and the first portion when viewed from the front surface of the first plate; a wireless communication circuit disposed inside the housing; and a processor disposed inside the housing and electrically connected to the touch screen display, the sensor, and the wireless communication circuit.

The touch screen display and the sensor may be exposed through the flat portion of the first plate.

The double-sided tape may be positioned between the rear surface of the first plate and a partial region of the recess portion of the metal portion to contact the rear surface of the first plate and a partial region of the recess portion of the metal portion.

In at least a partial area of the polymer portion and the metal portion, a curved surface facing the rear surface of the first plate and corresponding to a curvature of the curved edge portion of the first plate may be formed.

The recess portion may have a curvature of 0.3 R or more.

When viewed from the front surface of the first plate, a curvature of the upper and lower ends of the recess portion may be smaller than that of the right and left ends thereof.

When a distance from a border line of the flat portion and the curved edge portion to the corner is a and when a vertical distance from the corner to the front surface of the first plate is b, a value of a/b may be in a range of 2 to 8.

The electronic device may further include a camera module exposed through the flat portion of the first plate, wherein an undercut may be formed toward an outer peripheral surface of the side member in the polymer portion at a location in which the camera module is positioned.

The electronic device may further include a fixing bracket configured to support an end portion of one side of the camera module to be not separated after being inserted into the undercut.

FIG. 6 is a flowchart illustrating a process of producing an electronic device according to various embodiments of the present invention.

Figure 6A:
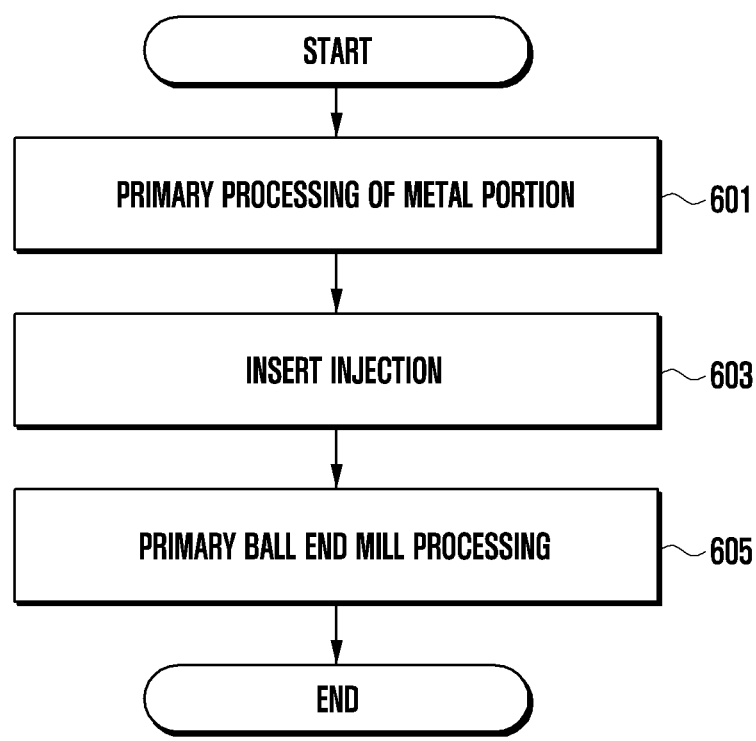
FIGS. 6A and 6B are flowcharts illustrating a process of producing an electronic device according to various embodiments of the present invention.

FIG. 6A illustrates a producing process of an electronic device when a recess portion is formed in a polymer portion. By performing a primary processing 601 in a metal portion 713 (FIG. 7A) of a side member and by inserting the primary processed metal portion 713 (see FIG. 7B), the polymer portion 715 (see FIG. 7C) may be injected molded 603. A final side member may be complete through cutting processing 605 using the ball end mill tool. In the cutting processing 605 using the ball end mill tool, some metal portions or polymer portions 715' (see FIG. 7C) may be cut and removed.

Figure 6B:
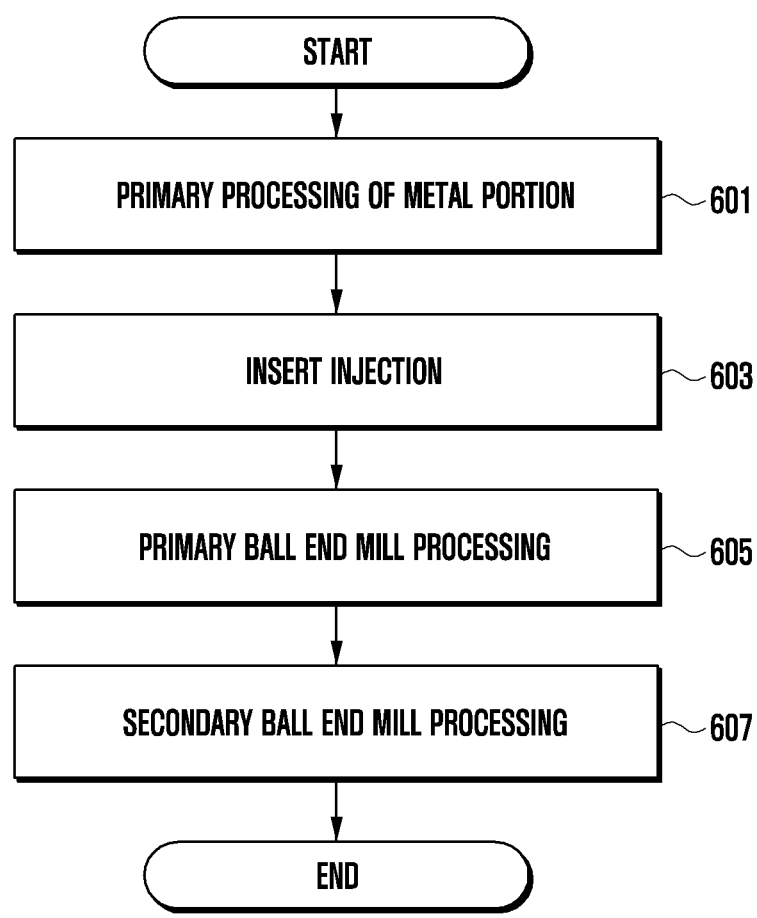

FIG. 6B illustrates a producing process of an electronic device when a recess portion is formed in a metal portion. By performing a primary processing 601 in the metal portion 713 (see FIG. 7A) of the side member and by inserting the primarily processed metal portion 713 (see FIG. 7B), the polymer portion 715 (see FIG. 7C) may be injected molded 603. A shape of the side member may be complete through primary ball end mill cutting processing 605, but by further processing recess portions corresponding to a corner portion of the first plate upper end and lower end through secondary ball end mill cutting processing 607, a curvature may be reduced. In the primary cutting operation 605 using the ball end mill tool, some metal portions or polymer portions 715' (see FIG. 10C) may be cut and removed.

Figure 7A:
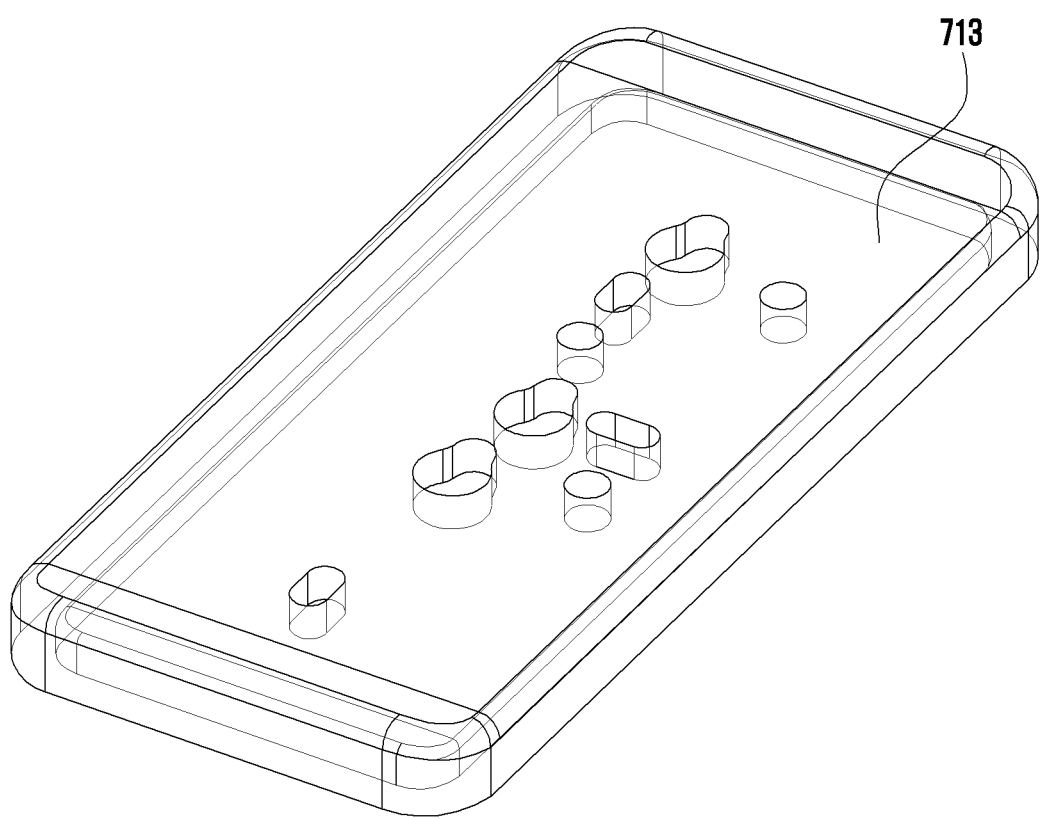
FIGS. 7A, 7B, 7C, and 7D are diagrams schematically illustrating a method of producing an electronic device according to various embodiments of the present invention.
Figure 7B:
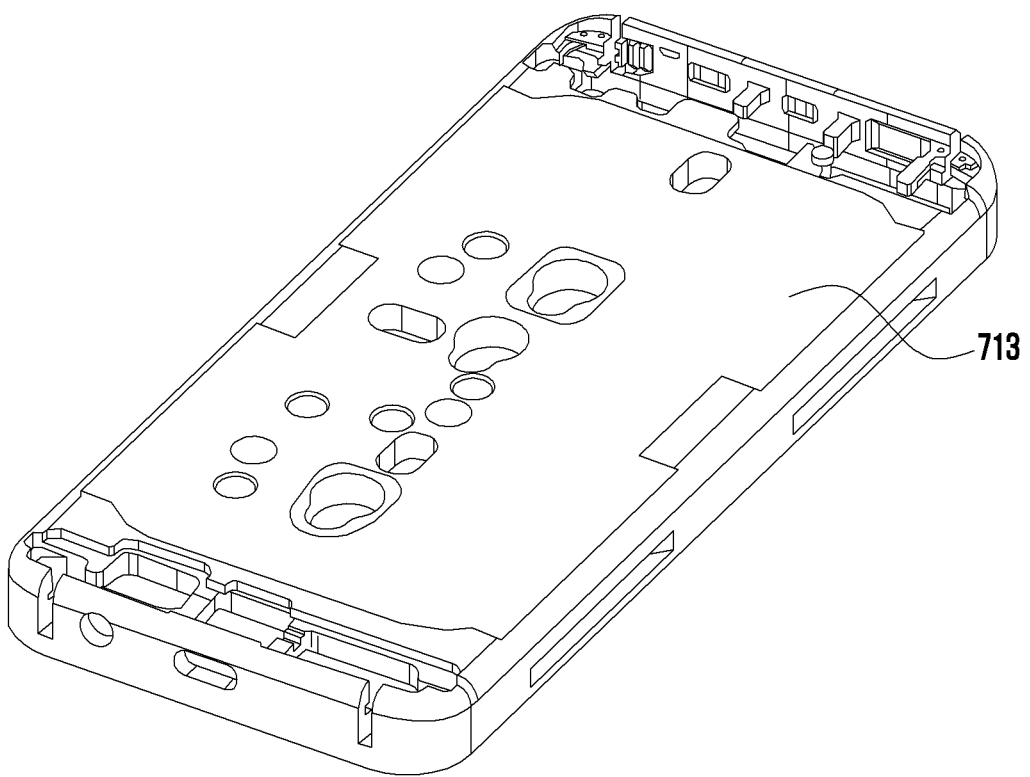
Figure 7C:
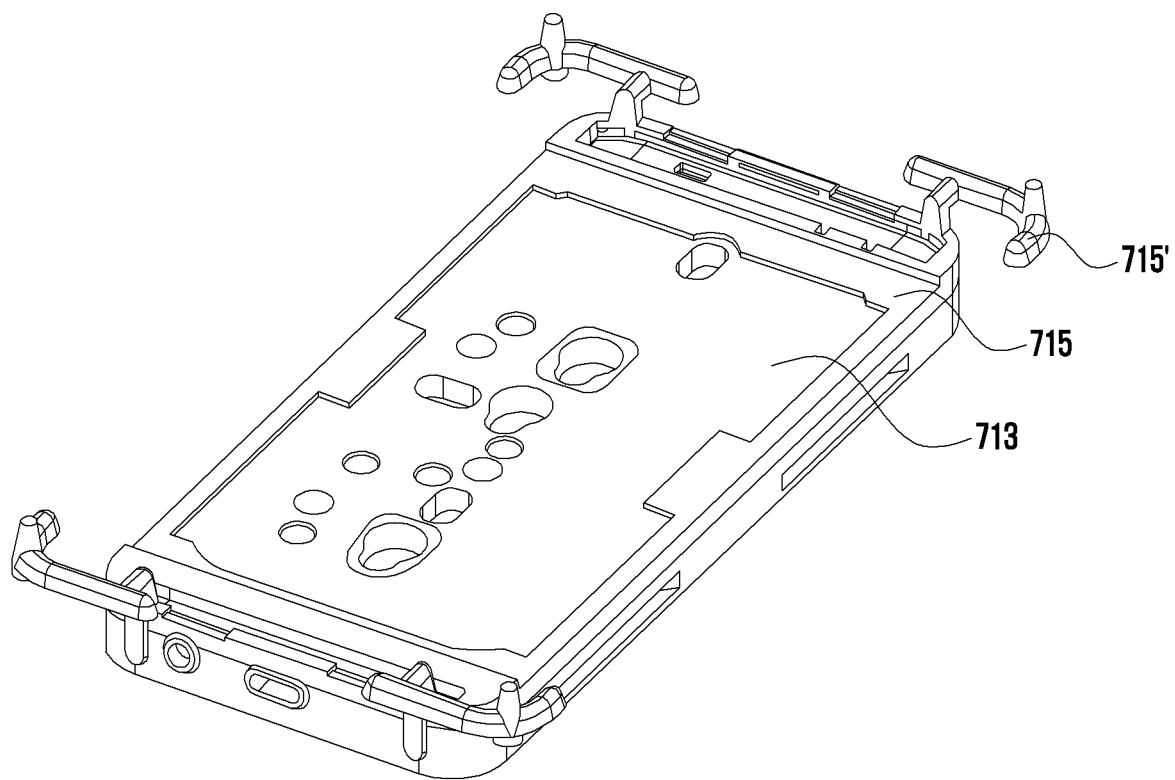
Figure 7D:
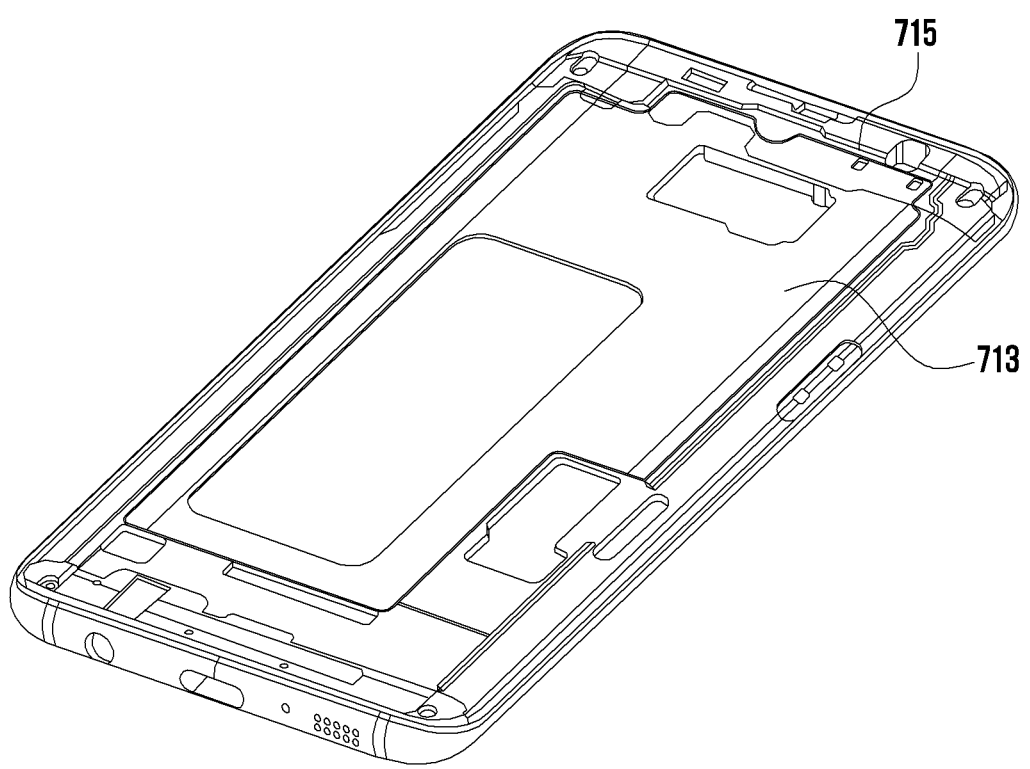

FIGS. 7A and 7D are diagrams schematically illustrating a method of producing an electronic device according to various embodiments of the present invention.

FIGS. 7A to 7D illustrate production operations in a time-series order according to an embodiment of the present invention and some operations may be omitted or may have a changed order, as needed.

When making a description of FIGS. 7A to 7D to correspond to the operations of FIG. 6, FIG. 7A illustrates a metal portion 713 prior to primary processing. FIG. 7B illustrates the metal portion 713 after primary processing by performing primary processing of holes for coupling various components necessary for the electronic device to the metal portion 713 of FIG. 7A. FIG. 7C illustrates a state in which the polymer portion 715 is injection molded by inserting the metal portion 713 of FIG. 7B. FIG. 7D illustrates a state in which the metal portion 713 and the polymer portion 715 illustrated in FIG. 10C finish primary ball end mill cutting processing or secondary ball end mill cutting processing.

An electronic device according to an embodiment of the present invention may include a housing produced through an operation of primarily processing a metal portion, an operation of processing a polymer portion and a recess portion through an insert injection process using the metal portion as an insert, and an operation of processing the metal portion through primary ball end mill cutting processing.

An electronic device according to an embodiment of the present invention may include a housing produced through an operation of primarily processing a metal portion, an operation of processing a polymer portion through an insert injection process using the metal portion as an insert, an operation of processing the metal portion and a recess portion through primary ball end mill cutting processing, and an operation of additionally processing at least some recess portions of the recess portion through a second ball end mill tool.

What is claimed is:

1. An electronic device, comprising:
   a housing comprising a first plate comprising a front surface and a rear surface, a second plate, and a side member enclosing a space between the first plate and the second plate,
   wherein the first plate comprises a flat portion, a corner, and a curved edge portion connecting between the flat portion and the corner, and wherein the side member comprises:
   a metal portion disposed adjacent to the corner of the first plate and having an exposed surface formed at the outside; and
   a polymer portion forming an internal structure supporting the rear surface of the first plate and whose at least a partial region is overlapped with the curved edge portion when viewed from the front surface of the first plate,
   wherein the metal portion comprises a recess portion extended along a lower portion of the corner of the first plate;
   a double-sided tape positioned between the rear surface of the first plate and the polymer portion to contact the rear surface of the first plate and the polymer portion;
   a touch screen display exposed through a first portion of the first plate;
   a sensor exposed through a second portion positioned between the corner and the first portion of the first plate when viewed from the front surface of the first plate;
   a wireless communication circuit disposed inside the housing; and
   a processor disposed inside the housing and electrically connected to the touch screen display, the sensor, and the wireless communication circuit,
   wherein the recess portion has a curvature of less than 0.5 R based on an end surface perpendicular to the corner.

2. The electronic device of claim 1, wherein the touch screen display and the sensor are exposed through the flat portion of the first plate.

3. The electronic device of claim 1, wherein the double-sided tape is positioned between the rear surface of the first plate and a partial region of the recess portion of the metal portion to contact the rear surface of the first plate and a partial region of the recess portion of the metal portion.

4. The electronic device of claim 1, wherein in at least a partial area of the polymer portion and the metal portion, a curved surface facing the rear surface of the first plate and corresponding to a curvature of the curved edge portion of the first plate is formed.

5. The electronic device of claim 1, wherein the recess portion has a curvature of 0.3 R or more.

6. The electronic device of claim 1, wherein a curvature of the upper and lower ends of the recess portion is smaller than that of the right and left ends thereof when viewed from the front surface of the first plate.

7. The electronic device of claim 1, wherein a value of a/b is in a range of 2 to 8, when a distance from a border line of the flat portion and the curved edge portion to the corner is a and when a vertical distance from the corner to the front surface of the first plate is b.

8. The electronic device of claim 1, further comprising a camera module exposed through the flat portion of the first plate,
   wherein an undercut is formed toward an outer peripheral surface of the side member in the polymer portion at a location in which the camera module is positioned.

9. The electronic device of claim 8, further comprising a fixing bracket configured to support an end portion of one side of the camera module to be not separated after being inserted into and coupled to the undercut.

10. An electronic device, comprising:
    a housing comprising a first plate comprising a front surface and a rear surface, a second plate, and a side member enclosing a gap between the first plate and the second plate,
    wherein the first plate comprises a flat portion, a corner, and a curved edge portion connecting between the flat portion and the corner, and wherein the side member comprises:

a metal portion disposed adjacent to the corner of the first plate and having an exposed surface formed at the outside; and a polymer portion forming an internal structure supporting the rear surface of the first plate and whose at least a partial region is overlapped with the curved edge portion when viewed from the front surface of the first plate, wherein the polymer portion comprises a recess portion extended along a corner position of the first plate, and wherein the recess portion has a curvature of less than 0.5 R based on an end surface perpendicular to the corner;

a double-sided tape positioned between the rear surface of the first plate and the polymer portion to contact the rear surface of the first plate and the polymer portion;

a touch screen display exposed through a first portion of the first plate;

a sensor exposed through a second portion positioned between the corner and the first portion of the first plate when viewed from the front surface of the first plate;

a wireless communication circuit disposed inside the housing; and a processor disposed inside the housing and electrically connected to the touch screen display, the sensor, and the wireless communication circuit.

11. The electronic device of claim 10, wherein the touch screen display and the sensor are exposed through the flat portion of the first plate.

12. The electronic device of claim 10, wherein the double-sided tape is positioned between the rear surface of the first plate and a partial region of the recess portion of the metal portion to contact the rear surface of the first plate and a partial region of the recess portion of the metal portion.

13. The electronic device of claim 10, wherein in at least a partial area of the polymer portion and the metal portion, a curved surface facing the rear surface of the first plate and corresponding to a curvature of the curved edge portion of the first plate is formed.

14. The electronic device of claim 10, wherein the recess portion has a curvature of 0.3 R or more.

15. The electronic device of claim 10, wherein a curvature of the upper and lower ends of the recess portion is smaller than that of the right and left ends thereof when viewed from the front surface of the first plate.

16. The electronic device of claim 10, wherein a/b has a value of 2 to 8, when a distance from a border line of the flat portion and the curved edge portion to the corner is a and when a vertical distance from the corner to the front surface of the first plate is b.

17. The electronic device of claim 10, further comprising a camera module exposed through the flat portion of the first plate, wherein an undercut is formed toward an outer peripheral surface of the side member in the polymer portion at a location in which the camera module is positioned.

18. The electronic device of claim 17, further comprising a fixing bracket configured to support the camera module to be not separated after being inserted into the undercut.

* * * * *